United States Patent
Chamorro et al.

(10) Patent No.: US 6,920,275 B2
(45) Date of Patent: Jul. 19, 2005

(54) APPARATUS AND METHOD OF BLINDLY INSERTING, EXTRACTING, AND MANIPULATING CONNECTORS WITHIN AN ENCLOSURE

(75) Inventors: German A. Chamorro, Tucson, AZ (US); Shawn M. Nave, Tucson, AZ (US); Raymond Yardy, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 10/400,894

(22) Filed: Mar. 27, 2003

(65) Prior Publication Data

US 2004/0190849 A1 Sep. 30, 2004

(51) Int. Cl.[7] .................................................. G02B 6/00
(52) U.S. Cl. ...................................... 385/137; 439/352
(58) Field of Search ................................ 385/134–139; 439/352

(56) References Cited

U.S. PATENT DOCUMENTS

| | | | |
|---|---|---|---|
| 5,245,688 A | 9/1993 | Watanabe et al. | |
| 6,024,498 A | 2/2000 | Carlisle et al. | |
| 6,186,672 B1 | 2/2001 | Takizawa et al. | |
| 6,193,421 B1 | 2/2001 | Tamekuni et al. | |
| 6,325,549 B1 | 12/2001 | Shevchuk | |
| 6,377,743 B1 | 4/2002 | Ueda et al. | |
| 6,439,776 B1 | 8/2002 | Harrison et al. | |
| 6,439,777 B1 | 8/2002 | Harrison et al. | |

OTHER PUBLICATIONS

Exabyte literature from www.exabyte.com, Exabyte 430M–FC Library, "Fibre Channel Supplement", p. 17, no date.

Primary Examiner—Javaid H. Nasri
(74) Attorney, Agent, or Firm—Jean M. Barkley; Dillon & Yudell LLP

(57) ABSTRACT

A tool is disclosed for blindly threading, connecting, and disconnecting a cable with respect to another cable or a connector. The tool threads the cable through a hole in a canister containing a tape drive, manipulates the cable, and inserts the cable into the connector while it is deep within the canister without opening the canister in order to connect a host computer to the tape drive. The tool is also used to disconnect the drive from the host by unlatching the cable from the connector and extracting the cable from the drive and the canister, again without opening the canister. The tool features a support for the cables and connector, and a releasable latch on the support. The latch includes a pair of mechanical clips in two places that are located along the length of the support.

17 Claims, 8 Drawing Sheets

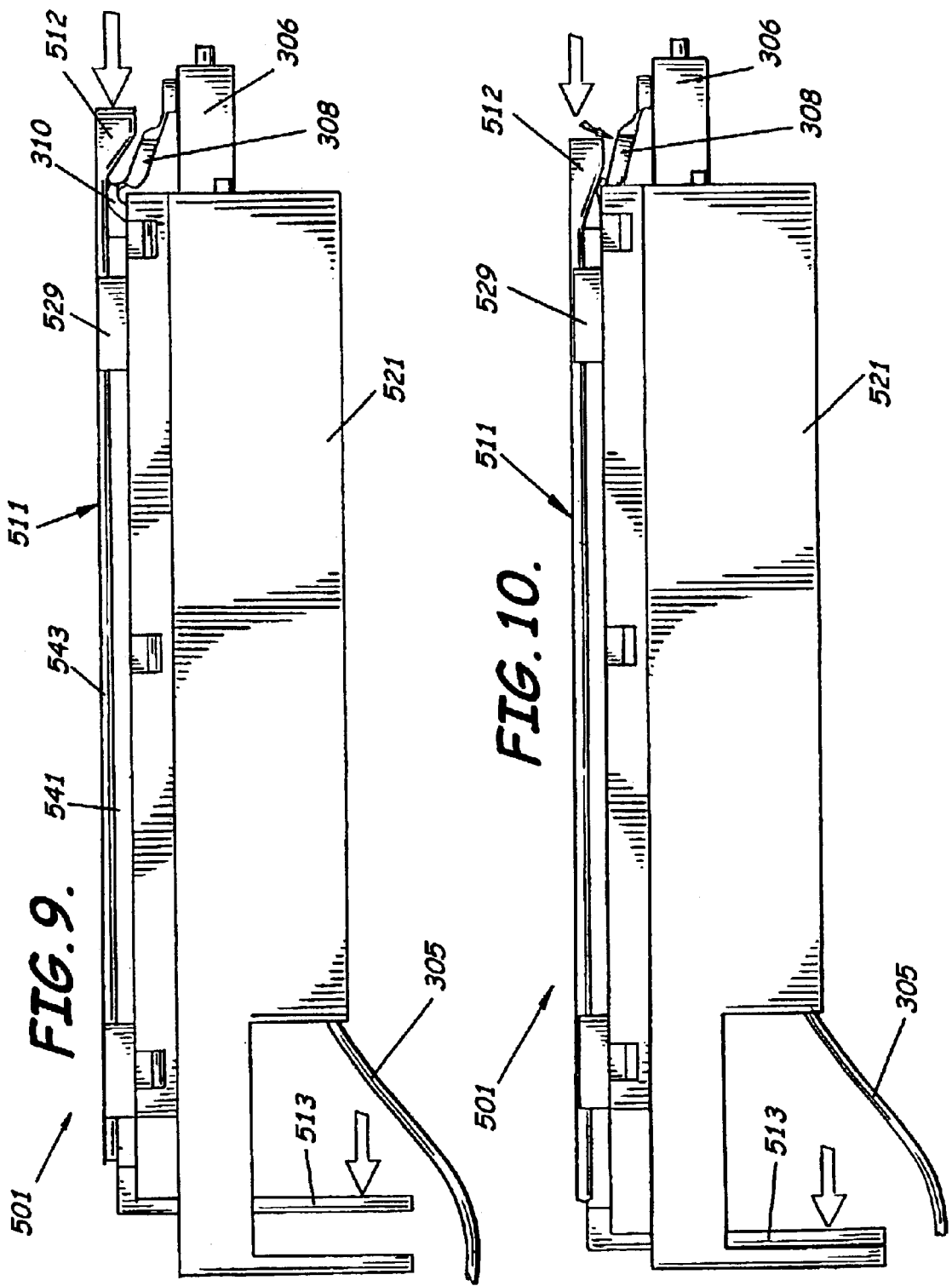

APPARATUS AND METHOD OF BLINDLY INSERTING, EXTRACTING, AND MANIPULATING CONNECTORS WITHIN AN ENCLOSURE

BACKGROUND OF THE INVENTION

1. Technical Field

The present invention relates in general to an improved tool for manipulating a cable, and in particular to an improved apparatus and method for blindly inserting, extracting, and manipulating a cable with respect to another cable or a connector within an enclosure.

2. Description of the Related Art

Data storage drives, such as data tape drives, record information to and read information from media, such as the data tape of a tape cartridge. Data storage drives are often used in conjunction with, for example, a data storage and retrieval system. One example of such a system is an automated library with robotic picking devices, wherein removable media cartridges are selectively transported between storage cells and media drives in an automated environment. Herein, automated data storage library, data storage and retrieval system, data storage and retrieval library, automated library, and library may all be used interchangeably.

The data storage drives that are removable during operation in the library or peripheral systems environment are sometimes referred to as "hot-pluggable." A data storage drive is typically mounted in a canister that is located within the library or system in order to facilitate its hot-plugging and unplugging. In some types of applications, the canister may have extra space within its enclosure for additional equipment besides the data storage drive. For example, the space may be used for additional ventilation or other functions. Although this space is useful for these purposes, it creates a problem in that the extra space or distance makes it difficult to access the data storage drive for the purposes of data connection and/or power connections. Although it is conceivable to solve this problem by using a "pigtail," e.g., a short cable assembly internal to the canister that extends to the exterior of the canister (i.e., beyond the back end), this solution is expensive. Such a pigtail would connect to the data storage drive and the host. Thus, an improved solution is needed to provide access to the data storage drive by the host so that an expensive pigtail is not needed.

SUMMARY OF THE INVENTION

One embodiment of a method and apparatus for threading a cable, such as a fiber optic cable, within a restricted access area is disclosed. The apparatus comprises a tool for connecting and disconnecting the cable with respect to another cable or a connector in a blind space (i.e., a space not visible or accessible to a human during normal operation). The tool is particularly well suited for threading the cable through a hole in a sealed canister containing a tape drive, manipulating the cable, and inserting the cable into the connector while it is deep within the canister and without opening the canister, in order to connect a host computer to the tape drive. The tool is also used to disconnect the drive from the cable by unlatching the cable from the connector and extracting the cable from the drive and the canister, again without opening the canister. In one embodiment, the tool features a flat carrier or support for the cables and/or connector, and a releasable latch on the support. The latch includes a pair of mechanical clips in two places that are spaced apart from each other along the length of the support.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

FIG. 9 is a side elevational view of the cable handling device of FIG. 5 and is shown in a latched position.

FIG. 10 is a side elevational view of the cable handling device of FIG. 5 and is shown in an unlatched position.

DETAILED DESCRIPTION OF A PREFERRED EMBODIMENT

Figure 1:
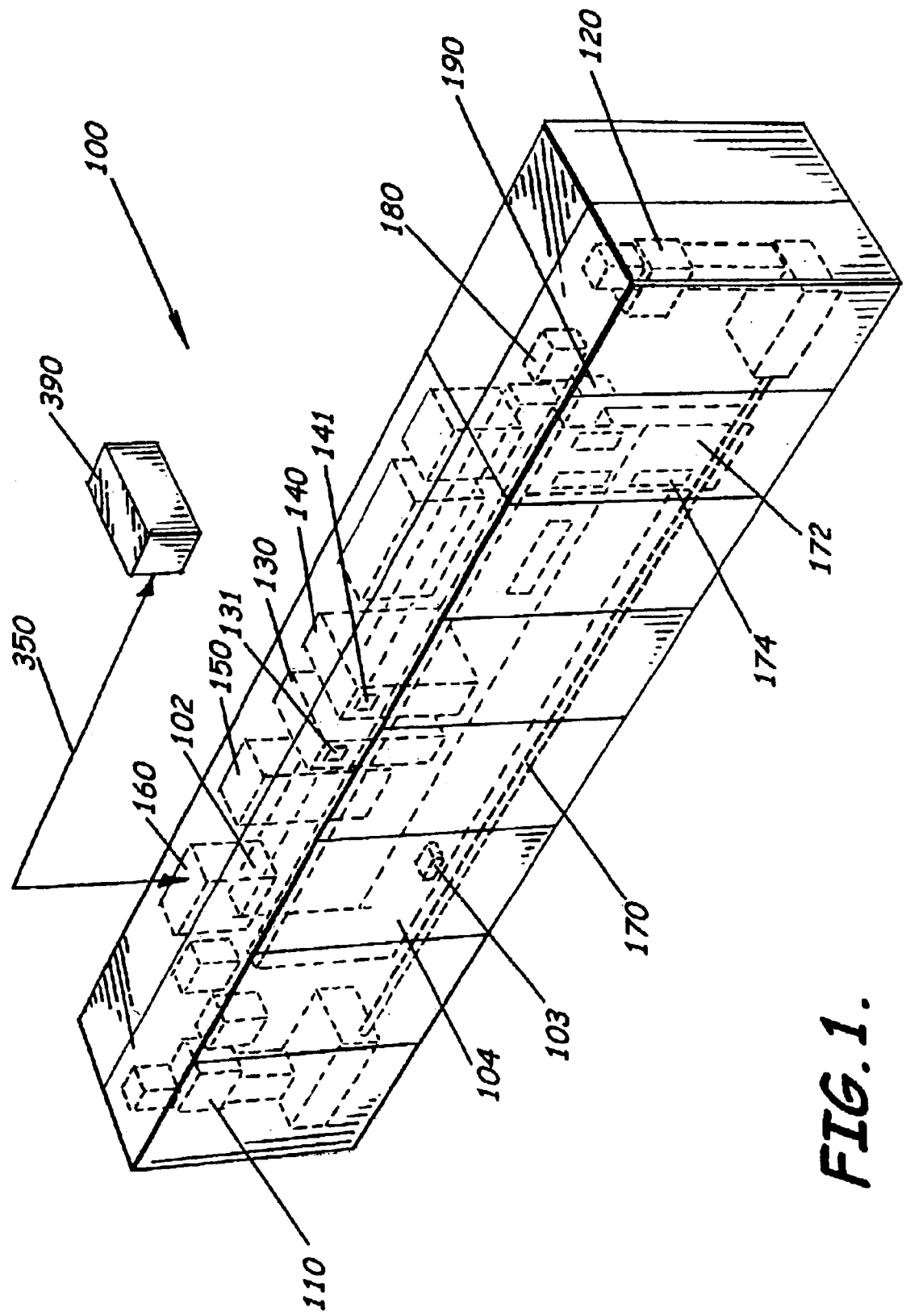
FIG. 1 is an isometric view of one embodiment of a data storage and retrieval system constructed in accordance with the present invention.

Referring to FIG. 1, a data storage and retrieval system 100 is shown. In the embodiment illustrated, data storage and retrieval system 100 is depicted as a robotic library. The upper interface of controller 160 allows data storage and retrieval system 100 to communicate with one or more hosts 390 via link 350. Link 350 may comprise an Ethernet, Infiniband, TCP/IP, Fibre Channel-Arbitrated Loop, SCSI, ESCON, FICON, or the like, depending on the application. The lower interface of controller 160 communicates with a plurality of media drives (such as tape drives) that are positioned in drive enclosures or "canisters" 130 and 140. Drive canisters 130 and 140 receive removable media cartridges, such as those commonly known in the art, via robotic pickers 110 and 120. The removable media cartridges 103 may contain magnetic tape, optical tape, optical disk media, magneto-optical disk, CD, DVD, phase-change media, floppy disk, removable hard disk, electronic media, and the like. Robotic pickers 110 and 120 travel along rail 170 to move removable media cartridges 103 from inner storage wall 102 and outer storage wall 104 to drive canisters 130 and 140 for the purposes of reading and/or writing data. Robotic pickers 110 and 120 also return the removable media cartridges 103 to storage walls 102 and 104.

An import/export station 172 includes access door 174 attached to the side of data storage and retrieval system 100. Access door 174 is preferably pivotally attached to the side of data storage and retrieval system 100; however, access door 174 could be slidably or otherwise attached. An operator panel or access station 150 permits a user to communicate directly with data storage and retrieval system 100. The operator access station 150 typically contains an LCD display, a keyboard or touch screen for user input, and circuits to monitor and control the I/O station doors.

First power component 180 and second power component 190 each comprise one or more power supplies that supply power to pickers 110 and 120, controller 160, operator access station 150, and drive canisters 130 and 140 of data storage and retrieval system 100. Typically, at least one of the power components 180 and 190 provides direct current (DC) power, since most computer peripheral devices use DC power. One of the power components 180 and 190 may provide alternating current (AC) power as well. Controller 160 is in communication with power components 180 and 190, pickers 110 and 120, operator access station 150, drive canisters 130 and 140, and tape drives of data storage and retrieval system 100.

Figure 2:
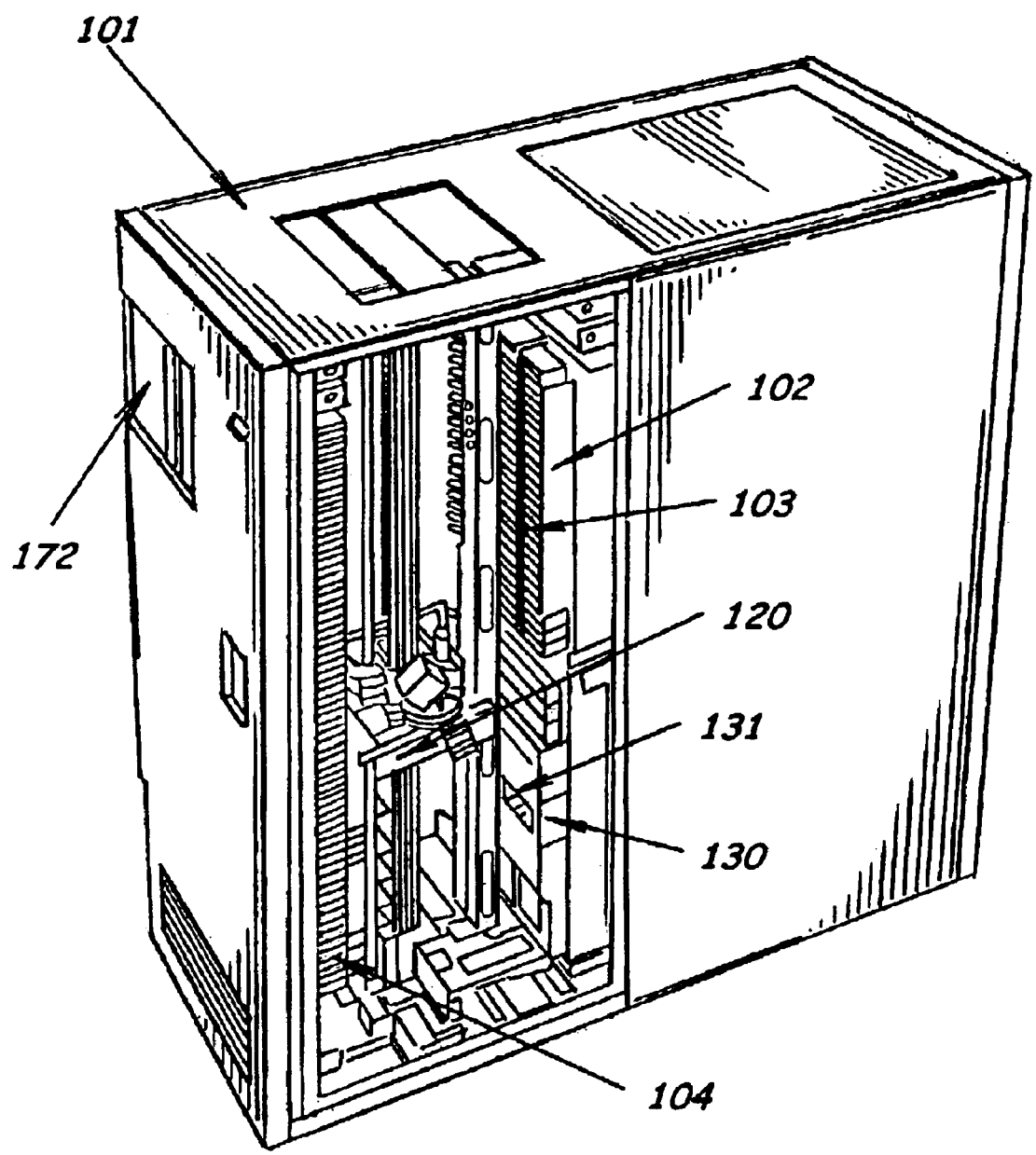
FIG. 2 is an isometric view of a storage module utilized by the data storage and retrieval system of FIG. 1.

The data storage and retrieval system 100 is typically assembled from a series of frames or storage modules 101, such as an L-frame type storage module illustrated in FIG. 2. The desired number of storage modules 101 are assembled into data storage and retrieval system 100. Storage module 101 has a picker 120, a drive canister 130, an inner storage wall 102, and an outer storage wall 104. A plurality of removable storage media 103 are located in each storage wall 102, 104. Removable storage media 103 are typically tape cartridges, but may also be other types of media such as those described above.

Removable storage media 103 are inserted via robotic pickers 110, 120 into drive canisters 130, 140 via entrances 131, 141 (FIG. 1), respectively, where removable storage media 103 are mounted inside the tape drive. Each picker 110, 120 includes a gripper assembly having a bar code scanner for reading cartridge labels, or other means for identifying the cartridges. A gripper assembly may contain, for example, a plurality of grippers for mixed media support (i.e., one gripper for each different media type in a single library), and/or a redundant gripper for libraries with a single type of media. The grippers are mounted in a cage that can pivot from one side of the library to the other. This allows access to both storage walls by either gripper.

Figure 11:
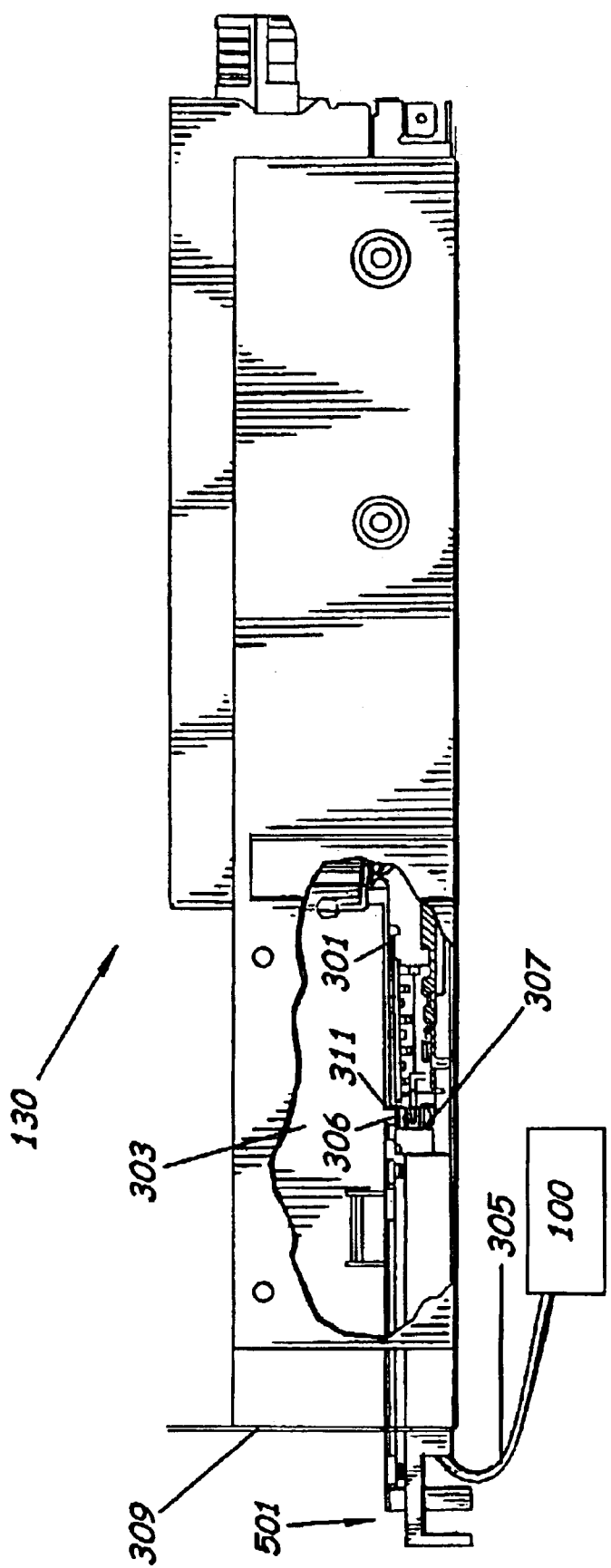
FIG. 11 is a schematic side view of a canister and media drive that the cable handling device of the present invention is designed to service.

Referring again to FIG. 2, some automated tape libraries, such as system 100, uses canisters 130 to house their tape drives. The canister 130 is used to mount the tape drive into the system 100. The canister 130 also facilitates cooling of the drive, and provides communication to the system 100 via external connectors, thereby allowing hot-plugging or "hot swapping" of drives, etc. One apparatus and method of communication to tape drives is through fiber optic cables. As shown in FIG. 11, a canister 130 for a tape drive 301 equipped with a plurality of fiber optic cables 305 (one shown) must be able to provide a reliable path for the fiber cable communications to run from the system 100 or host to the tape drive. A fiber cable communication system includes connectors such as conventional prior art LC fiber connectors 307.

Typically, the canister 130 for a tape drive 301 is physically longer than the tape drive 301 itself. The extra volume 303 within the canister 130 is required for cooling fans, various interfacing cables, etc. The extra volume also forms a space between the back 311 of the tape drive 301 and the back 309 of the canister 130. For example, in some drive canisters there is an approximately three-inch gap between the back of the tape drive and the back of the canister. A method is needed to allow the fiber cables 305 that extend from the host or rest of the system 100 to plug into the back of the tape drive 301 and overcome this gap 303. However, because of the limited space and small size of the fiber cable connectors 306 on the cables 305, access to the back of the tape drive 301 through the canister 130 is very restricted. Thus, the fiber cables 305 and their connectors 306 cannot be readily plugged into the connectors 307 of the tape drive 301.

Figure 3:
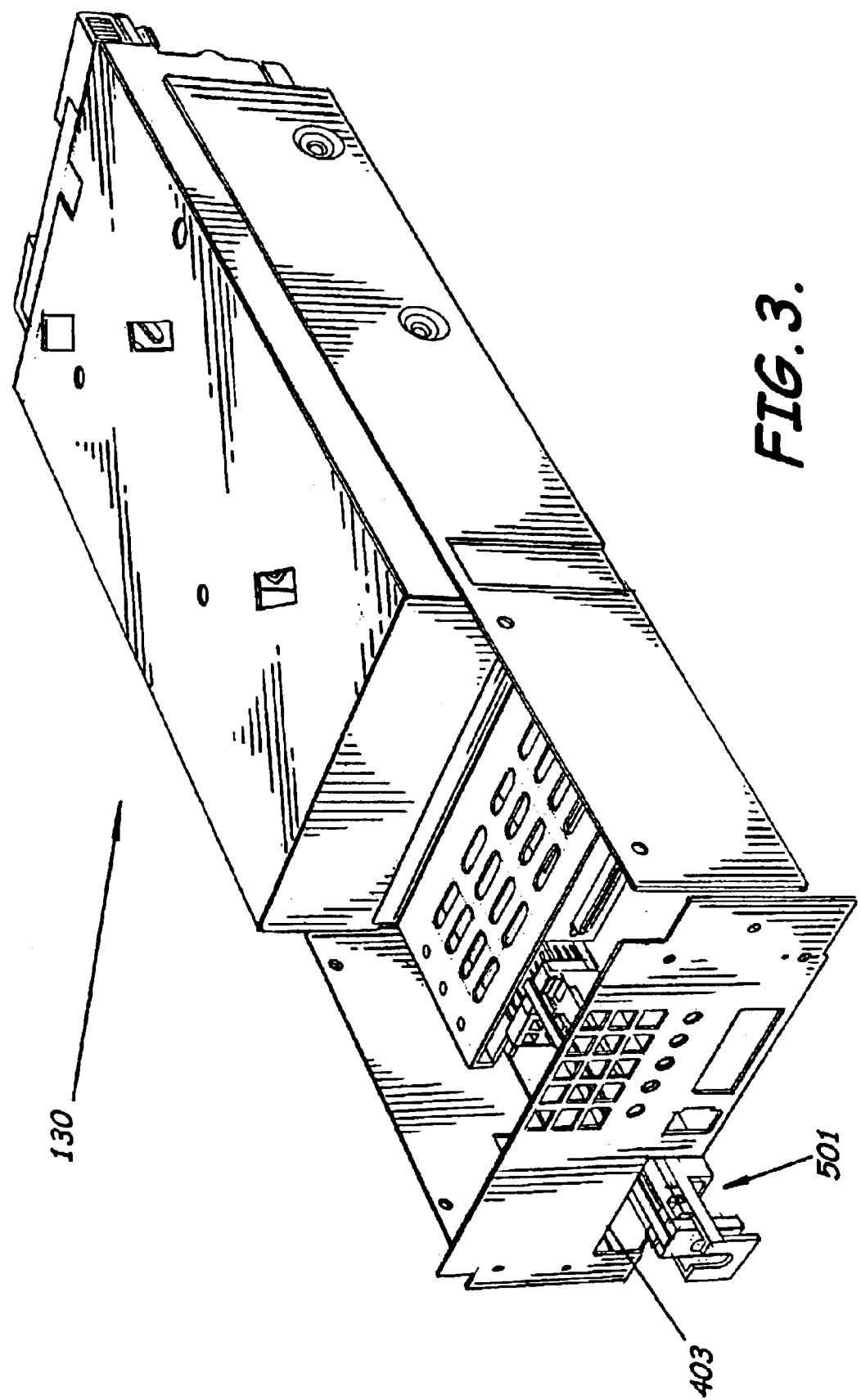
FIG. 3 is a reverse isometric view of the storage module or canister of FIG. 2.

Referring now to FIGS. 4 and 6–8, one embodiment of a system, sub-system, apparatus, and tool 401 constructed in accordance with the present invention is shown. Tool 401 provides a way of inserting connectors and cables into and extracting connectors and cables from the tape drive 301 through, for example, a small hole 403 (FIG. 3) in the back 309 of the canister 130. The tool 401 allows the cables 305, such as fiber optic cables, to retain their same latching and/or unlatching configuration and function inside the drive 301 and canister 130, while allowing the user to easily perform these operations from outside the canister 130. Additionally, and as will be demonstrated, the fiber cables 305 and their connectors 306 maintain their integrity by simply snapping into the tool 401.

Disclosed are two examples or embodiments that provide substantially equivalent functions for the present invention, which includes systems for facilitating blind manipulation of components. Each of the two embodiments comprises a mechanism of three components. The first described solution, hereinafter the "key" apparatus 401 and method (FIGS. 4 and 6–8), acts by turning a key 411 for latching and unlatching the cable connectors 306 (FIG. 11). The second solution, hereinafter the "slide" apparatus 501 and method (FIGS. 5 and 9), provides a movable slide 511 for latching and unlatching the cable connectors 306.

Common to both types of devices is a rigid sleeve 421, 521, respectively, for the fiber cables 305. The sleeves 421, 521 allow the cables 305 to be plugged into their appropriate connectors 306 without requiring human-reachable access in through the back 309 of the canister 130 and around the connectors 307 of the cables 305. The sleeves 421, 521 not only provide a rigid support for the cables 305, but also protect the cables 305 from being damaged during insertion into or removal from the canister 130 and drive 301. In addition, the sleeves 421, 521 are used to hold the connectors 306 of the cable 305 in the correct mating orientation so that they are readily matched with and plugged into the connectors 307 on the drive 301. This feature is accomplished by using a retention feature 423, 523 (FIGS. 4 and 5), respectively, that is located at the front of the sleeve 421, 521 that fits around small features on the fiber connector 306, as shown. The fiber connector 306 mounts and is retained in the retention features 423, 523 by being, for example, snapped into place so that there is a snug fit in the sleeves 421, 521, respectively.

Figure 6:
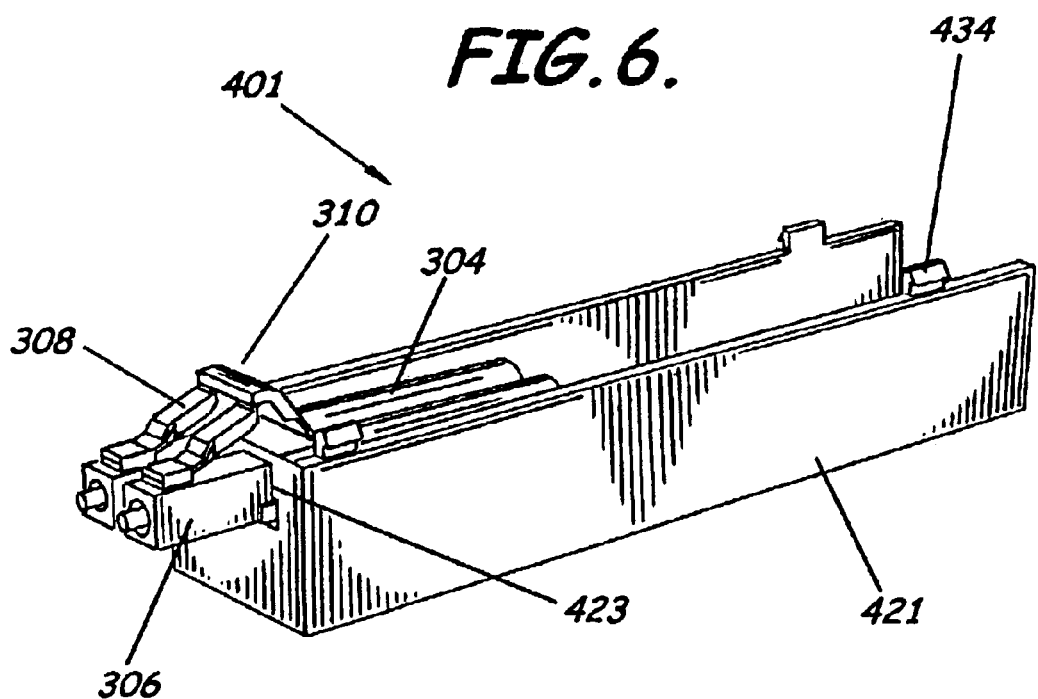
FIG. 6 is an isometric view of a sub-assembly of the cable handling device of FIG. 4 and is constructed in accordance with the present invention.

Each embodiment of the present invention also has a removable cover that, for example, interlocks or snaps onto the sleeve. See, e.g., top cover 425 for tool 401. These top covers are slightly different for each embodiment, but perform approximately the same function. First, the top cover acts as a cover for protecting and enclosing the fiber cables 305 within the sleeve. Also, the top covers are used to push on the backs of the connectors 306 when inserting them into the tape drive 301. This latter feature is performed by having a protrusion or, e.g., a contour 427 (FIG. 7) on the bottom of the cover 425 that fits in a space between the two stiffeners 304 of cables 305 on the back of the connectors 306. The contour 427 provides an area with which to force the connectors 306 into a more secure fit in the retention features 423, 523, which are described above. As shown in FIG. 6 for the key embodiment 401, sleeve 421 is provided with a plurality of snap features 434 that releasably engage cover 425 (FIG. 8) in order to retain cover 425 on sleeve 421.

Other features of the top cover include guides for the key 401 or the slide 501 embodiments. For example, guides 429 of the key 401 embodiment secure and support the rotatable shaft 431, whereas guides 529 of the slide 501 embodiment secure and support the slide 511, during the unlatching of the cable connectors 306. The guides 429, 529 have a different configuration that is particularly adapted for each embodiment.

Figure 4:
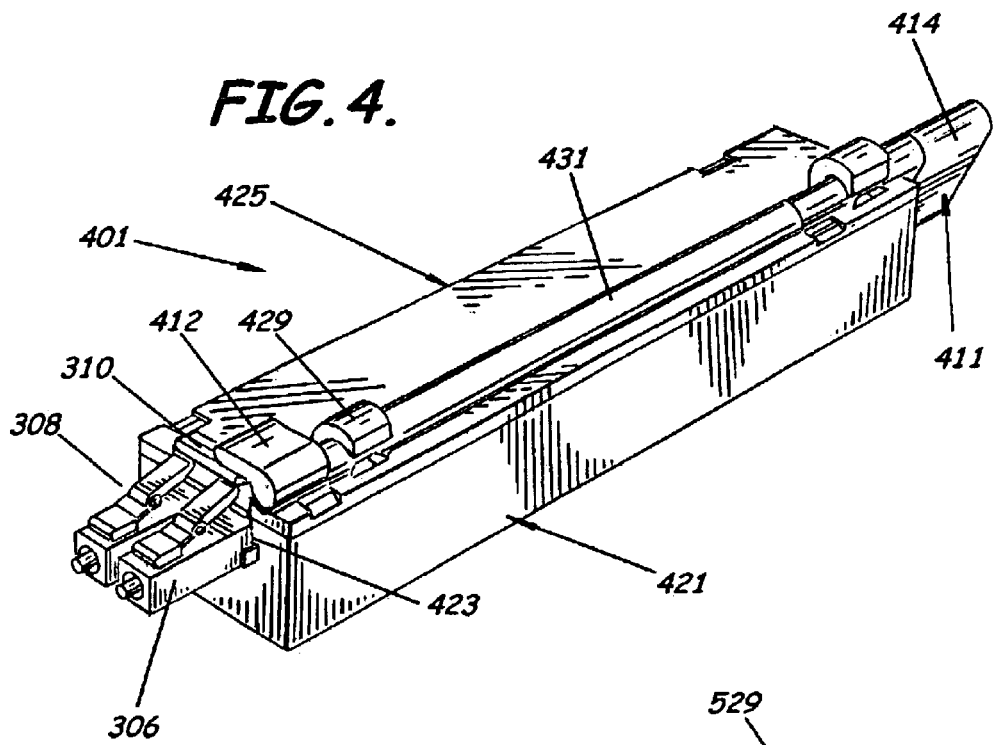
FIG. 4 is an isometric view of one embodiment of a cable handling device constructed in accordance with the present invention.
Figure 5:
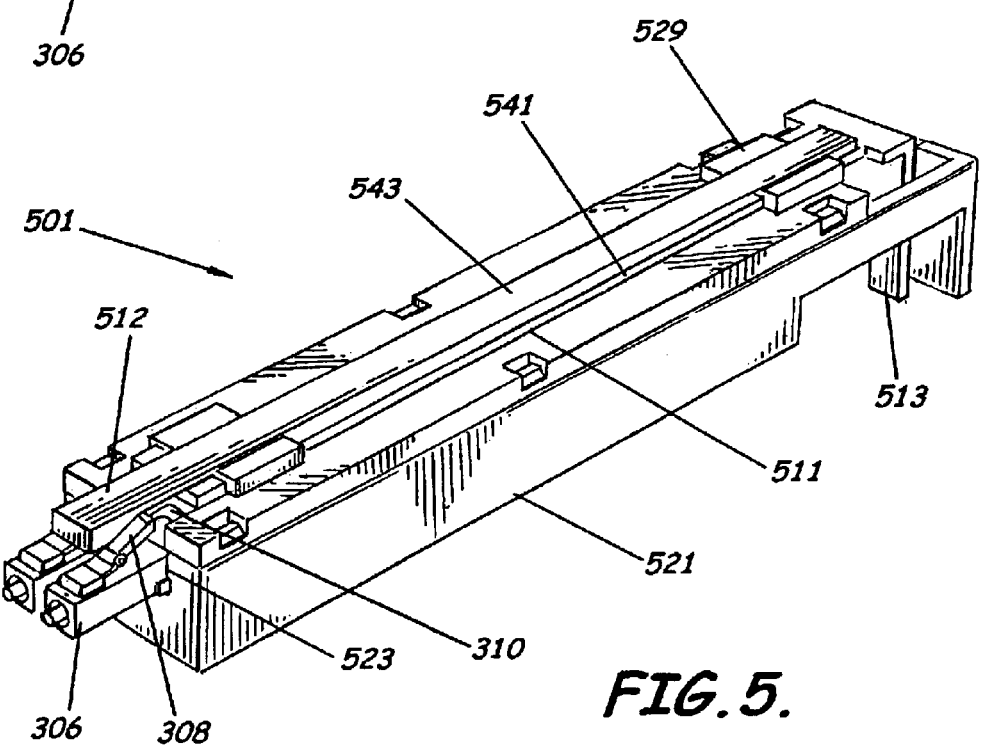
FIG. 5 is an isometric view of another embodiment of a cable handling device constructed in accordance with the present invention.
Figure 7:
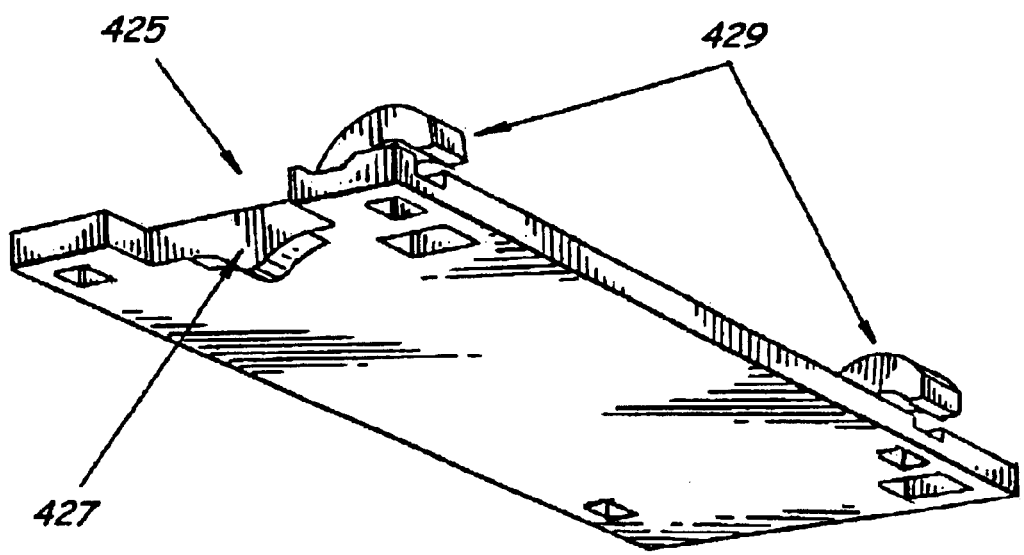
FIG. 7 is an isometric view of a cover of the cable handling device of FIG. 4 and is constructed in accordance with the present invention.
Figure 8:
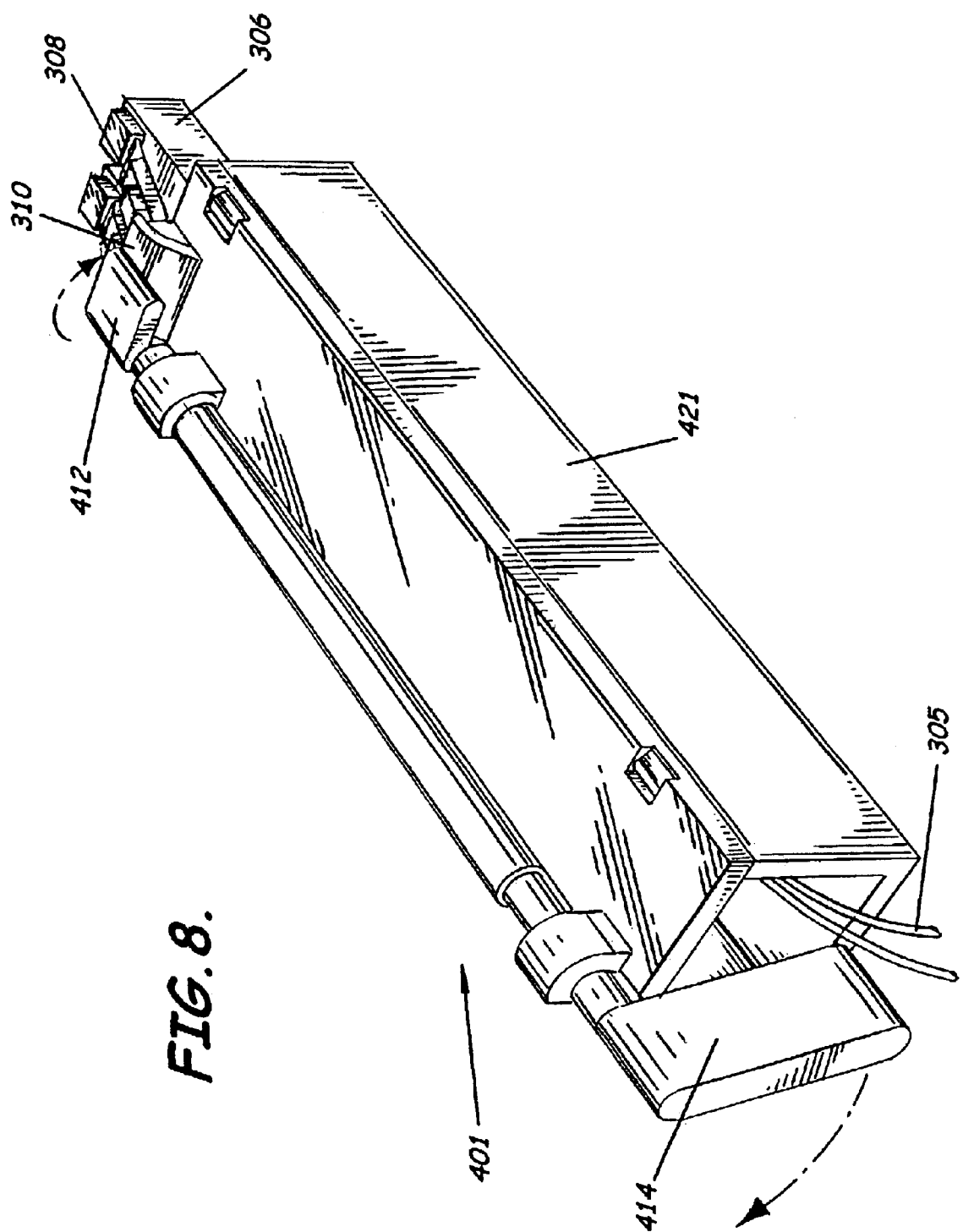
FIG. 8 is a rear isometric view of the cable handling device of FIG. 4 and is constructed in accordance with the present invention.

As shown in FIGS. 4, 7, and 8, each guide 429 (two shown) comprises a C-shaped member that extends from the upper surface of top cover 425. The guides 429 define cylindrical channels that closely receive and retain the shaft 431 of key 411. The key 411 has a key handle 414 and an opposite end 412 comprising a tab-like actuator, both of which are fixed for rotation with shaft 431. Key handle 414 is manually rotated by the user about the axis of shaft 431. When key handle 414 is rotated, shaft 431 is also rotated within guides 429 which, in turn, rotates end 412. The rotation of end 412 is designed to depress and release the integrated pivot actuators 308, 310 (best shown in FIG. 10), which is part of the standard LC fiber connector. Pivot actuator 310 is "integrated" since it is designed to simultaneously actuate all of the plurality of individual pivot latches 308 of the cables 305 and connectors 306. The pivot latches 308 are located on top of the cable connectors 306. The pivot actuator 310 is mounted to the pivot latches 308 and/or the connectors 306. Together with cables 305 which extend from connectors 306, these four sets of components are collectively referred to as "the interface assembly." In the embodiments shown, there is one pivot latch 308 for each cable 305 and its associated connector 306, such that each pivot latch 308 may be independently actuated. However, in the present embodiment the pivot latches 308 are simultaneously actuated by pivot actuator 310.

The slide 511 of the slide embodiment 501 (FIGS. 5, 9, and 10) comprises, in the version shown, a flat, elongated, rectangular bar having an integrated, two piece design: a lower portion 541 and an upper portion 543. The upper portion 543 extends beyond the lower portion 541 at the front end of slide 511, while the lower portion 543 extends beyond the upper portion 543 at the rear end of slide 511. The distal or front end 512 of upper portion 543 has a block-like shape that is tapered on its lower surface for directly and slidably engaging the pivot actuator 310 (compare FIGS. 9 and 10). The lower portion 541 of slide 511 is located in the set of guides 529 (four shown), each of which comprises an inverted L-shaped channel for retaining slide 511 on top cover 525. Upper portion 543 of slide 511 is located between the guides 529. A slide handle 513 extends from lower portion 541.

Once the fiber cables 305 are plugged into the tape drive 301, the pivot latches 308 on top of the connectors 306 hold the cables 305 in a "locked" position (FIGS. 4 and 5) in the tape drive 301 (FIG. 11). The tools 401, 501 remain inside the canister 130 while the cables 305 are interconnected with the drive 301. In order to remove the cables 305 from the drive 301, the connectors 306 are unlatched from connectors 307 of drive 301 by pushing down on the pivot actuator 310 which, in turn, moves the pivot latches 308 on the top of the connectors 306. See, e.g., FIGS. 9 and 10, wherein slide 511 moves back to depress pivot actuator 310, which moves pivot latches 308 which, in turn, releases connectors 306 of cables 305 from connectors 307 of the drive 301 (FIG. 11). The cable connectors 306 otherwise cannot be easily reached within the small space 303 at the back of the canister 130. Thus, the key 401 or slide 501 is used to unlatch the connectors 306 from outside the canister 130. The key embodiment 401 acts by rotating within the guides 429 in the top cover 425 to push down on the pivot latch 308 on top of the connectors 306, thus unlatching the cables 305. When the key 411 is manually turned by the user (approximately one-eighth of a turn), the opposite end 412 of the key 411 comes in contact and pushes down the pivot latch 308 on the connectors 306. The slide 511 functions by the user pulling the slide handle 513 back away from the tape drive 301. When this happens, the front end 512 of the slide 511 causes the pivot latch 308 on the connectors 306 to ramp down and unlatch. In both cases after the cable connectors 306 are unlatched, the user can easily remove the entire device or assembly (i.e., tool 401 or 501, cables 305, and connectors 306) out of the canister 130.

When the device is removed out of the canister 130, the top cover can be removed so that the fiber cable 305 can be removed from the tool. With the original fiber cable 305 removed, the device is now ready to house a different fiber cable. This easy interchangeability allows the user to readily change fiber cables with respect to the different tape drives in the system 100. These devices can be used in various applications where cable stiffness or extension is needed, as well as the ability to latch and unlatch the cables in remote or less-accessible areas. This concept is not limited to fiber cables, but can be modified to function for various types and sizes of cables.

The method and apparatus of the present invention has several advantages, including threading a cable, such as a fiber optic cable, within a restricted access area. The apparatus connects and disconnects the cable with respect to another cable or a connector in a blind space (i.e., a space not visible or accessible to a human during normal operation). The tool is particularly well suited for threading the cable through a hole in a sealed canister containing a tape drive, manipulating the cable, and inserting the cable into the connector while it is deep within the canister and without opening the canister, in order to connect a host computer to the tape drive. The tool is also used to remotely disconnect the drive from the host by unlatching the cable from the connector and extracting the cable from the drive and the canister, again without opening the canister.

Moreover, the method of the present invention blindly connects and disconnects a set of cables having connectors with respect to an enclosure having restricted physical access. The enclosure has an opening with a profile, an electronic device is located inside the enclosure, and the electronic device has an array of connectors that are spaced apart from the opening. The set of cables are placed in a tool such that the connectors of the cables are mounted in a retention feature in the tool and pre-aligned with the array of connectors in the enclosure. The tool has a profile that is complementary to the profile of the opening. The tool is inserted into the opening in the enclosure until the connectors of the cables engage and interconnect with the array of connectors in the enclosure. The connectors of the cables are disengaged by remotely disconnecting the connectors of the cables with the tool such that the connectors of the cables disengage the array of connectors in the enclosure. The step of remotely disconnecting may comprise, for example, manually sliding a bar on the tool to slidingly disengage the connectors of the cables from the array of connectors in the enclosure, or manually turning a key to rotationally disengage the connectors of the cables from the array of connectors in the enclosure.

While the invention has been shown or described in only some of its forms, it should be apparent to those skilled in the art that it is not so limited, but is susceptible to various changes without departing from the scope of the invention.

What is claimed is:

1. An apparatus for manipulating a cable having a connector, the apparatus comprising:
    a sleeve having a retention feature adapted to receive and retain the connector such that the cable is located in the sleeve;
    a cover removably mounted to the sleeve for protecting and enclosing the cable between the sleeve and the cover, the cover being adapted to engage and secure the connector in the retention feature;
    an actuator mounted to one of the sleeve and the cover for engaging the connector in order to engage and release the connector from being retained in the sleeve; and
    a mechanism mounted to one of the sleeve and the cover and movable with respect to the cover and the sleeve for selectively engaging the actuator to move the actuator between engaged and disengaged positions relative to the connector.

2. The apparatus of claim 1 wherein the mechanism comprises a rotatable key having a shaft, a handle on one end of the shaft, and an opposite end of the shaft for engaging the actuator, the shaft being captured in a set of guides on the cover, the guides having cylindrical channels that closely receive and retain the shaft, wherein rotation of the handle rotates the shaft and the opposite end to move the actuator between the engaged and disengaged positions relative to the connector.

3. The apparatus of claim 1 wherein the mechanism comprises a movable slide having a bar, a handle on one end of the bar, and an opposite end of the bar for engaging the actuator, the bar being captured in a set of guides on the cover, the guides having channels for closely receiving and retaining the bar on the cover, wherein movement of the handle slides the bar and the opposite end to move the actuator between the engaged and disengaged positions relative to the connector.

4. A system for facilitating blind manipulation of components, comprising in combination:
    an interface assembly having a plurality of connectors, each having a latch and a cable extending therefrom, and an actuator for simultaneously engaging all of the latches to move the latches between engaged and released positions;
    a tool for manipulating the interface assembly; the tool comprising:
        a sleeve for supporting the interface assembly, the sleeve having a retention feature for receiving and releasably retaining the connectors such that the cables are located in and extend through the sleeve;
        a cover removably mounted to the sleeve for protecting and enclosing the cables between the sleeve and the cover, the cover having a set of guides extending therefrom, and a feature for engaging the actuator to secure the connectors in the retention feature; and
        a slide mounted to the cover and having a bar located in the set of guides for sliding movement with respect to the cover and the sleeve, a handle on one end of the bar, and an opposite end of the bar located opposite the handle, such that movement of the handle slides the bar in the guides and moves the opposite end of the bar into and out of engagement with the actuator to selectively move the latches between the engaged and released positions.

5. The system of claim 4, wherein the bar is flat, elongated, and rectangular and includes an integrated, two piece design comprising a lower portion and an upper portion, with the upper portion extending beyond the lower portion at the opposite end, and the lower portion extending beyond the upper portion at the handle.

6. The system of claim 5, wherein the lower portion of the bar is located in the set of guides, each of which comprises an inverted L-shaped channel for retaining the slide on the cover, and the upper portion of the bar is located between the set of guides.

7. The system of claim 4, wherein the opposite end of the bar has a block-like shape that is tapered on a lower surface for directly and slidably engaging the actuator.

8. The system of claim 4, further comprising a tape drive, and wherein the tool is used to connect and disconnect the interface assembly relative to the tape drive.

9. A system for facilitating blind manipulation of components, comprising in combination:
    an interface assembly having a plurality of connectors, each having a latch and a cable extending therefrom, and an actuator for simultaneously engaging all of the latches to move the latches between engaged and released positions;
    a tool for manipulating the interface assembly; the tool comprising:
        a sleeve for supporting the interface assembly, the sleeve having a retention feature for receiving and releasably retaining the connectors such that the cables are located in and extend through the sleeve;
        a cover removably mounted to the sleeve for protecting and enclosing the cables between the sleeve and the cover, the cover having a set of guides extending therefrom, and a feature for engaging the actuator to secure the connectors in the retention feature; and
        a key assembly mounted to the cover and having a shaft located in the set of guides for rotational movement with respect to the cover and the sleeve, a handle on one end of the shaft, and an opposite end of the bar located opposite the handle, such that rotation of the handle about the shaft rotates the bar in the guides and rotates the opposite end of the shaft into and out of engagement with the actuator to selectively move the latches between the engaged and released positions.

10. The system of claim 9, wherein each of the guides in the set of guides comprises a C-shaped member that extends from an upper surface of the cover, each member defining cylindrical channels that closely receive and retain the shaft of the key assembly.

11. The system of claim 9, further comprising a tape drive, and wherein the tool is used to connect and disconnect the interface assembly relative to the tape drive.

12. A method of blindly connecting and disconnecting a set of cables having connectors with respect to an enclosure having restricted physical access, comprising:

providing an enclosure having an opening with a profile, and an electronic device located inside the enclosure, the electronic device having an array of connectors that are spaced apart from the opening;

placing the set of cables in a tool such that the connectors of the cables are mounted in a retention feature in the tool and pre-aligned with the array of connectors in the enclosure, the tool having a profile that is complementary to the profile of the opening;

inserting the tool into the opening in the enclosure until the connectors of the cables engage and interconnect with the array of connectors in the enclosure; and, to disconnect the connectors of the cables;

remotely disconnecting the connectors of the cables with the tool such that the connectors of the cables disengage the array of connectors in the enclosure.

13. The method of claim 12, wherein the step of remotely disconnecting comprises sliding a bar on the tool to slidingly disengage the connectors of the cables from the array of connectors in the enclosure.

14. The method of claim 13, wherein the step of sliding the bar on the tool is performed manually.

15. The method of claim 12, wherein the step of remotely disconnecting comprises turning a key to rotationally disengage the connectors of the cables from the array of connectors in the enclosure.

16. The method of claim 15, wherein the step of turning the key on the tool is performed manually.

17. The method of claim 12, further comprising the steps of providing a tape drive, and using the tool to connect and disconnect the array of connectors relative to the tape drive.

* * * * *